United States Patent [19]

Kubota et al.

[11] Patent Number: 5,862,292

[45] Date of Patent: *Jan. 19, 1999

[54] RECORDING AND REPRODUCING DEVICE FOR DIGITAL SIGNAL INCLUDING IC CARD

[75] Inventors: Yukio Kubota; Keiji Kanota, both of Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 831,828

[22] Filed: Apr. 2, 1997

Related U.S. Application Data

[63] Continuation of Ser. No. 156,849, Nov. 24, 1993, abandoned.

[30] Foreign Application Priority Data

Dec. 4, 1992 [JP] Japan ................................. 4-351032

[51] Int. Cl.⁶ .............................. H04N 5/91; H04N 5/926
[52] U.S. Cl. .............................................. 386/46; 386/124
[58] Field of Search ................................... 386/46, 1, 34, 386/35, 38, 40, 117, 123, 124, 127, 126, 131; 360/32; H04N 5/91, 5/926

[56] References Cited

U.S. PATENT DOCUMENTS

| | | | |
|---|---|---|---|
| 4,963,994 | 10/1990 | Levine | 358/335 |
| 4,977,455 | 12/1990 | Young | 358/335 |
| 5,153,730 | 10/1992 | Hagasaki et al. | 358/209 |
| 5,239,382 | 8/1993 | Hatakenake et al. | 358/335 |
| 5,264,944 | 11/1993 | Takimura | 358/335 |
| 5,355,409 | 10/1994 | Hirashima | 380/14 |
| 5,406,380 | 4/1995 | Tetex | 358/332 |

OTHER PUBLICATIONS

PCT Patent Application WO 93/05452 (Croy et al.).

Japan Patent Information Organization abstract corresponding to Japanese Patent JP 60–29957 (Hashimoto '957).

Japan Patent Information Organization abstract corresponding to Japanese Patent JP 60–29958 (Hashimoto '958).

*Primary Examiner*—Robert Chevalier
*Attorney, Agent, or Firm*—Jay H. Maioli

[57] ABSTRACT

A digital VCR incorporates an IC card reader/writer that cooperates with an IC card that stores therein control data corresponding to the transmission format of video signals to be recorded. The signal processing circuits with the digital VCR are controlled by the control data and are structured of digital signal processors and the operations of the circuits are controlled such that the sync block length and the like of the record data are controllable. A host interface is connected to a modem is and the modem connected to a host computer of a bank, a department store, or the like through the public phone network, so that the digital VCR can be utilized as a terminal unit for an IC card application system for home banking, home shopping, and so on.

18 Claims, 7 Drawing Sheets

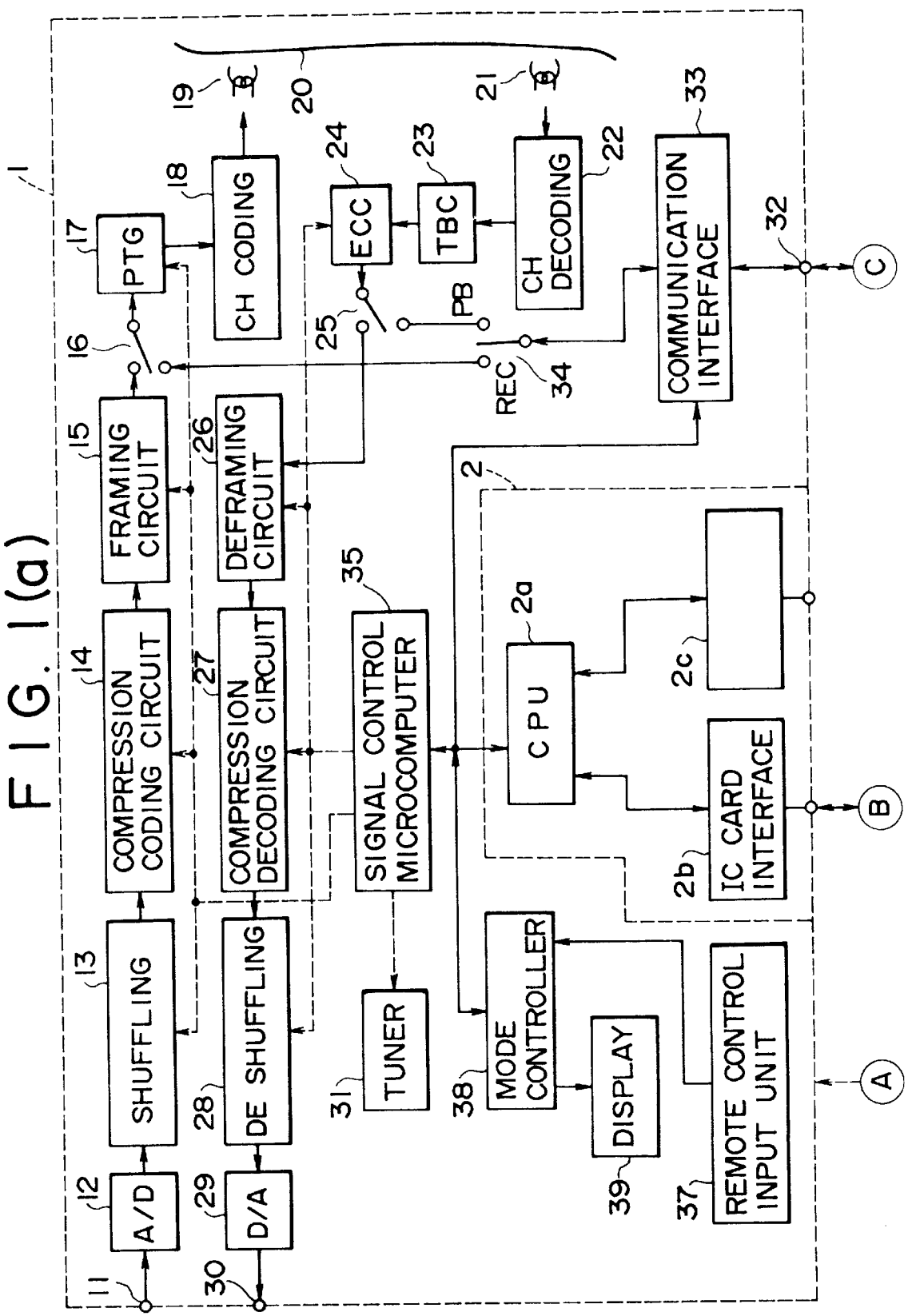

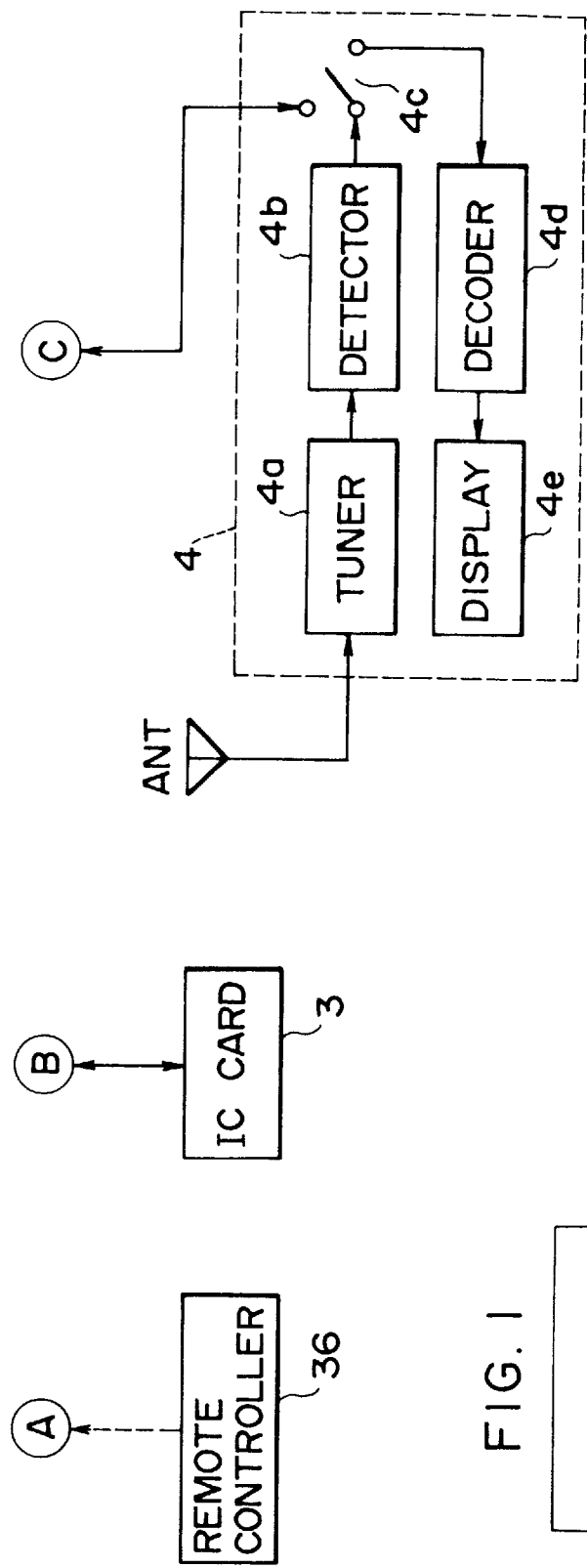

| FRID | SYNC 7 |
|---|---|
| RESERVED | SYNC 6 |
| RTYPE 1 | SYNC 5 |
| RTYPE 0 | SYNC 4 |
| SYNC 11 | SYNC 3 |
| SYNC 10 | SYNC 2 |
| SYNC 9 | SYNC 1 |
| SYNC 8 | SYNC 0 |

| | |
|---|---|
| SP/LP | RESERVED |
| FORMAT TYPE | RESERVED |
| RTYPE 1 | RESERVED |
| RTYPE 0 | SYNC 4 |
| FORMAT TYPE | SYNC 3 |
| FORMAT TYPE | SYNC 2 |
| FORMAT TYPE | SYNC 1 |
| RESERVED | SYNC 0 |

RECORDING AND REPRODUCING DEVICE FOR DIGITAL SIGNAL INCLUDING IC CARD

This is a continuation of application Ser. No. 08/156,849 filed Nov. 24, 1993 abandoned.

BACKGROUND OF THE INVENTION

1. Field of the Invention

The present invention relates to a digital video signal recording and reproducing apparatus such as a digital video cassette recorder (VCR) and, more particularly, to a digital video signal recording and reproducing apparatus incorporating an IC card reading/writing unit.

2. Description of the Background

There have been put on the market various types of analog VCRs for use in the home. Although a home digital VCR has not yet been marketed, there are a number of examples that underwent trial manufacture and these are identified by Y. Eto, et al. in "Digital Video Recording Technology", p. 158.

Since the above-described analog VCRs and digital VCRs have their circuits arranged to record and reproduce video signals in the existing formats, in the event that a video signal in a new format is employed, they cannot record and reproduce the signal unless additional circuits supporting the new format are attached to them. Further, such VCRs are unable to perform operations other than recording and reproducing video signals.

OBJECTS AND SUMMARY OF THE INVENTION

Accordingly, it is an object of the present invention to solve such problems as described above and, specifically, it is an object of the present invention to provide a digital video signal recording and reproducing apparatus capable of recording and reproducing signals in future formats without the need for attaching new circuits thereto.

It is another object of the present invention to provide a digital video signal recording and reproducing apparatus which can also be used as a terminal unit for IC card application systems. Thus, the present invention in one aspect provides a digital video signal recording and reproducing apparatus with an IC card reader/writer.

In one embodiment of the present invention the IC card stores control data corresponding to the transmission format of a recorded video signal. Such an IC card is loaded into the IC card reader/writer incorporated in the digital video signal recording and reproducing apparatus and, thereby, the signal processing circuits in the digital video signal recording and reproducing apparatus are controlled. The signal processing circuits in the digital video signal recording and reproducing apparatus are structured of digital signal processors (DSPs), and the circuits are controlled in operation such that the sync block length of record data or the track pattern is changed by the control data stored in the IC card.

Further, in the reproduction mode an IC card storing control data corresponding to the transmission format of the reproduced digital signal is used and the signal processing circuits in the reproducing system are controlled in response to this control data.

In another embodiment, the present invention also provides recording, in the ATF area, of data corresponding to the transmission format of the recorded signal and, by reproducing the data, provides control of the signal processing circuits in the reproducing system in accordance with the data.

In addition, a compression coding circuit can be formed of a digital signal processor and a compression coding system can be set up using an IC card storing control data corresponding to the compression coding system.

Also, the selection frequency of an integrated tuner can be controlled by the use of an IC card. Further, a scramble decoder can be controlled by the use of an IC card storing control data capable of descrambling scrambled signals that are either received or recorded.

Still further, by employing a host interface to the IC card reader/writer the digital video signal recording and reproducing apparatus can be used as a terminal unit for IC card application systems such as home banking, home trade, home shopping, home reservations and so on.

According to the present invention, by loading an IC card storing specific control data into an IC card reader/writer incorporated in a digital video signal recording and reproducing apparatus, operational control and the like of the signal processing circuits of the recording and reproducing system, the selection frequency of the tuner, the format of the scramble decoder, and so on can be achieved. Further, the apparatus can also be used as a terminal unit for an IC card application system.

The above and other objects, features, and advantages of the present invention will become apparent from the following detailed description of preferred embodiments to be read in conjunction with the accompanying drawings.

BRIEF DESCRIPTION OF THE DRAWINGS

FIGS. 1(a) and 1(b) block diagrams schematically showing the structure of a digital VCR according to an embodiment of the present invention;

DETAILED DESCRIPTION OF THE DRAWINGS

Figure 2:
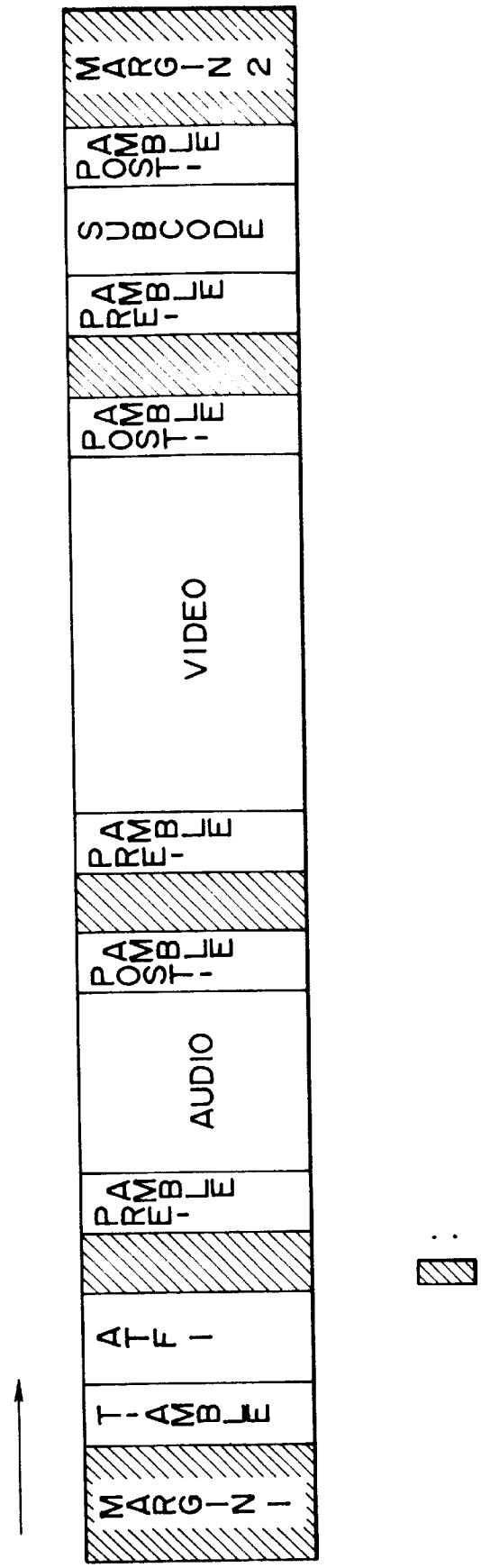
FIG. 2 is a diagram showing a data arrangement recorded on one track in the digital VCR according to an embodiment of the invention.

Referring to FIG. 1(a), an analog video signal input at a terminal 11 of a digital VCR 1 is converted to a digital video signal by an A/D converter circuit 12. The digital video signal data then undergoes a change in order by a shuffling circuit 13 as well as undergoing discrete cosine transformation and variable length encoding in a compression coding circuit 14. Output of the compression coding circuit 14 is arranged into a format code structure in a framing circuit 15 and is supplied to a parity generating circuit 17 through a switching circuit 16. In the parity generating circuit 17, the signal is given parity, synchronization code, and ID data and is then supplied to a channel coding circuit 18. The signal is subjected therein to parallel/serial conversion and conversion to a record code, and then is recorded on a magnetic tape 20 by a recording head 19. On the magnetic tape 20, the digital video signal for one frame, together with the digital audio signal, subcode signal, ATF pilot signal, and others are recorded as a plurality of oblique tracks, for example, 10 tracks in the NTSC system, 20 tracks in the HDTV system. The recording head 19 is formed, for example, of a pair of heads having different azimuth angles and disposed at an interval of 180° on a rotating drum. Processing systems for the audio signal, subcode signal, and ATF signal are not shown, because the use of such systems are well known.

A digital video signal reproduced from the magnetic tape 20 by a playback head 21 is subjected to decoding of the record code and serial/parallel conversion in a channel decoding circuit 22 and is subjected to time base correction in a time base corrector 23. The output of the time base corrector 23 is subjected to error correction processing with the use of product code in an Error Correcting Coding (ECC) circuit 24 and is supplied to a deframing circuit 26 through a switching circuit 25. The signal supplied to the deframing circuit 26 is converted therein to variable length coded data, which is then subjected to decoding of the variable length code and inverse discrete cosine conversion in a compression decoding circuit 27. The signal is then restored to data in the original order in a deshuffling circuit 28, converted to an analog video signal in a D/A converter 29, and output at terminal 30.

In this embodiment, the circuits in the recording system from the shuffling circuit 13 to the parity generating circuit 17 and the circuits in the reproduction system from the ECC circuit 24 to the deshuffling circuit 28 are formed of DSPs and are controlled by a signal control microcomputer 35 to operate under optimum conditions. The details of this DSP control by the control microcomputer will be described below.

Referring to FIG. 1(b), a remote controller 36 is used for setting operational modes, such as ON/OFF, Record, Play, Fast Forward, Record Timer, of the digital VCR 1. The signal specifying the operational mode transmitted from the remote controller 36 is supplied from a remote control input unit 37 to a mode controller 38. The mode controller 38 detects the input operational mode and outputs the appropriate control signal to the pertinent part. A display 39 displays the operational mode. The remote control 36 is used as a key pad when the digital VCR 1 is used as a terminal unit for an IC card application system. The output of the mode controller 38 is also supplied to a CPU 2a of an IC card reader/writer 2.

FIG. 2 shows an example of a data arrangement recorded on one track of a digital VCR according to an embodiment of the present invention. The example shown is a data arrangement of a recorded digital video signal, in which the left end of the track is the input side to the head and the right end is the output side, that is, the track is shown traveling from left to right in relation to the head.

In preamble and postamble areas, disposed on both ends of the data record area, there is recorded a pulse signal, with the same frequency as the bit frequency of the data, to be used for reproduction of the clock by means of a PLL. Data are not recorded in margin areas or in inter block gaps (IBG), which are shown shaded in FIG. 2. At left and right ends of the track there are provided a margin 1 and a margin 2, respectively. Next to the margin there is disposed a Track-amble or T-amble and then a first automatic tracking frequency (ATF) area, ATF 1, in which an ATF pilot signal and a timing sync are recorded. There are disposed then, from left to right in FIG. 2, record areas of the digital audio signal, the digital video signal, and the subcode signal.

Figures 3A, 3B:
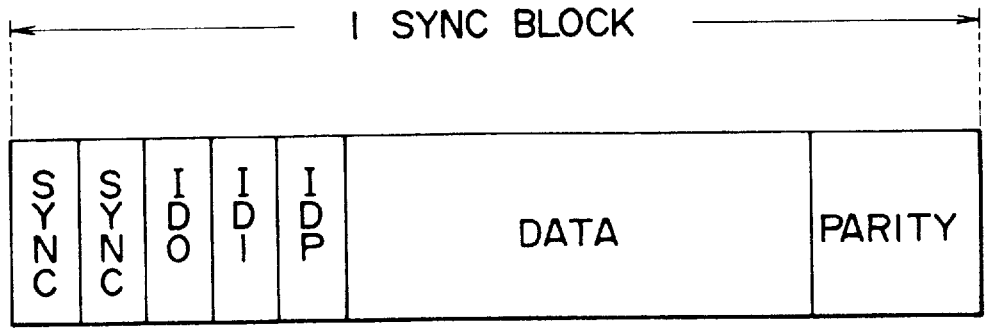
FIGS. 3(a) and 3(b) are diagrams showing a format and ID in the record data in an embodiment of the invention.

FIGS. 3(a) and 3(b) are diagrams showing examples of the format of record data and ID data in this embodiment of the invention. As shown in FIG. 3(a), there are disposed two bytes of sync codes and three bytes of IDs, one byte of which is ID parity, in front of each block data of predetermined length, which is followed by a parity code. The format is formed in the framing circuit 15 or the parity generating circuit 17 in FIG. 1. The data length and parity are set when a television signal is recorded, for example, in the pattern shown in FIG. 2, such that the digital video signal has 77 bytes for data and 8 bytes for parity, the digital audio signal has 77 bytes for data and 8 bytes for parity, and the subcode signal has 5 bytes for data and 2 bytes for parity.

When a television signal is recorded in the pattern shown in FIG. 2, the ID data of FIG. 3(b) in two bytes is defined as follows:

(a) the most significant bit of the first byte: frame ID;

(b) the seventh bit of the first byte: reserved;

(c) the sixth and fifth bits of the first byte: identification of the record data, that is video, audio, or subcode;

(d) the first to fourth bits of the first byte: sync block numbers;

(e) the most significant bit to the first bit of the second byte: sync block numbers.

Further, it may be well to record data identifying the format of the recorded television signal, such as NTSC, PAL, HD, wide vision, using one byte of the record data portion.

The case where an analog video signal input at the terminal 11 is recorded has been described above. The analog video signal input at terminal 11 may be a video signal generated by an external video camera (not shown), a video signal output from a tuner 31 incorporated in the VCR 1, or the like. The digital VCR 1 can also record a signal of digital broadcasting, streamer, or the like input from a digital I/O port 32. The apparatus shown in FIG. 1 is adapted to record a signal of digital broadcasting received by an external digital broadcasting picture receiver 4. Operation in such a case will be described below.

Referring to FIG. 1(b), an electromagnetic wave carrying digital broadcasting received by an antenna ANT is input to the digital broadcasting picture receiver 4. The signal of the digital broadcasting is compression coded on the transmission side according to a predetermined algorithm. From the signal of the digital broadcasting input to the digital broadcasting picture receiver 4, a signal of a desired channel is selected by a tuner 4a and the signal is converted to a bit stream signal by a detector 4b.

When it is desired to see the bit stream signal, the switching circuit 4c is switched over to the side of a decoder 4d and the signal is compression decoded in the decoder 4d and displayed on a display unit 4e. When it is desired to record the signal in the digital VCR 1, the switching circuit 4c is switched over to the side of the external output and the signal is supplied to the digital I/O port 32 of the digital VCR 1.

Referring to FIG. 1(a), the bit stream signal input from the digital I/O port 32 to a communication interface 33 is input to the parity generating circuit 17 through a switching circuit 34 and the switching circuit 16. The record processing thereafter is the same as with an analog video signal input at the terminal 11. Also, the processing in this reproduction operation is the same as that in the ordinary reproduction operation up to the stage where error correcting processing is performed with the product code in the ECC circuit 24.

The output of the ECC circuit 24 is input to the digital broadcasting picture receiver 4 through the switching circuit 25, switching circuit 34, communication interface 33, and the digital I/O port 32. The signal is fed from the switching circuit 4c to the decoder 4d to be compression decoded therein and then displayed on the display unit 4e.

Figure 4A:
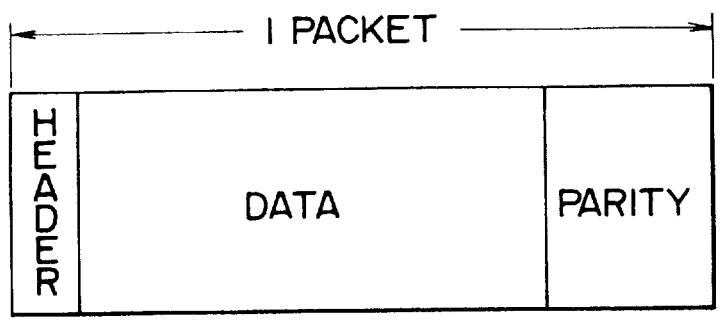
FIGS. 4(a) and 4(b) are diagrams showing a digital broadcast format.
Figure 4B:
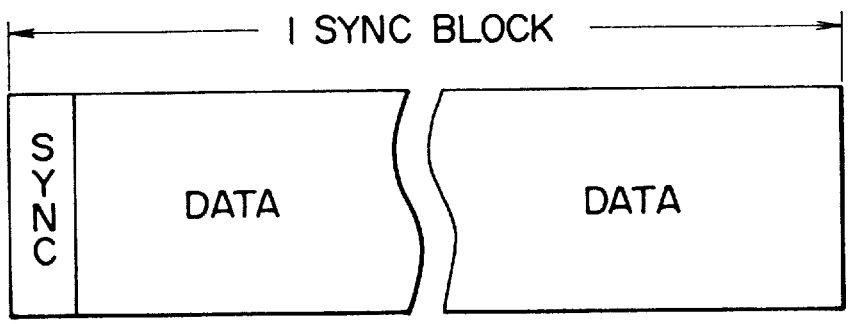

The bit stream signal of the digital broadcasting has compressed data of a predetermined length has, a header at the front and a parity word at the rear, as shown in FIG. 4(a) and, thereby, forms one packet. Alternately, it is arranged in a format of a sync block having a predetermined length, which can be one frame, of data with a sync code at the front, as shown in FIG. 4(b). If the parity generating circuit 17 or the ECC circuit 24 is so structured that the record data length and the like shown in FIG. 3(a) have fixed values, digital broadcasting will not be supported by them in the event that digital broadcasting in new transmission formats having different packet lengths or different sync block lengths is used in the future.

Accordingly, in this embodiment, the parity generating circuit 17 and the ECC circuit 24 are structured of DSPs and are adapted such that a format in which such parameters as the record data length are changed can be set up easily in accordance with control data corresponding to a transmission format of digital broadcasting stored in an IC card 3. The IC card 3 is provided with CPU, ROM, RAM, and EPROM. The control data corresponding to the transmission format of digital broadcasting stored in the EPROM is input from an IC card interface 2b of the IC card reader/writer 2. The CPU 2a identifies the content of the data and supplies it to the signal control microcomputer 35. The signal control microcomputer 35 controls the parity generating circuit 17 and the ECC circuit 24 to process data in the format corresponding to the transmission format of the digital broadcasting. When digital broadcasting in some new transmission format is used in the future, an IC card corresponding to the transmission format can be produced and utilized in the present invention to process data in such new format.

It is desired here that the record data length is set to be an integral multiple or an integral submultiple of the packet length in digital broadcasting. Alternatively, it is desired to be an integral submultiple of the sync block length of digital broadcasting. If such a setting is so made, reproduction of data becomes easy even when changed-speed reproduction is performed at the time of Cue/Review or the like.

According to the digital VCR of this embodiment as described above, the parity generating circuit 17 and the ECC circuit 24 are structured such that they can freely change the data length of record data. Therefore, even when the format of digital broadcasting is changed or a new format appears in the future, the signal of the digital broadcasting in the new format can then be recorded by using an IC card storing control data corresponding to the new format.

While operations in the case where an IC card storing control data corresponding to a transmission format of digital broadcasting have been described above, the digital VCR is also capable of recording and reproducing a streamer input from the digital I/O port. In this case, the data length of one sync block shown in FIG. 3(a) is set to an optimal length corresponding to the streamer and the track pattern shown in FIG. 2 is changed to a pattern suited to the streamer. For example, the pattern may be changed so that the divisions of audio, video, and subcode, as well as the IBGs and amble areas provided therebetween are eliminated.

The ATF area of the track of data, referred to as "format type", identifies and records record data such as digital broadcasting, streamer, and its parameters such as data length and sync block length.

Figures 5, 6:
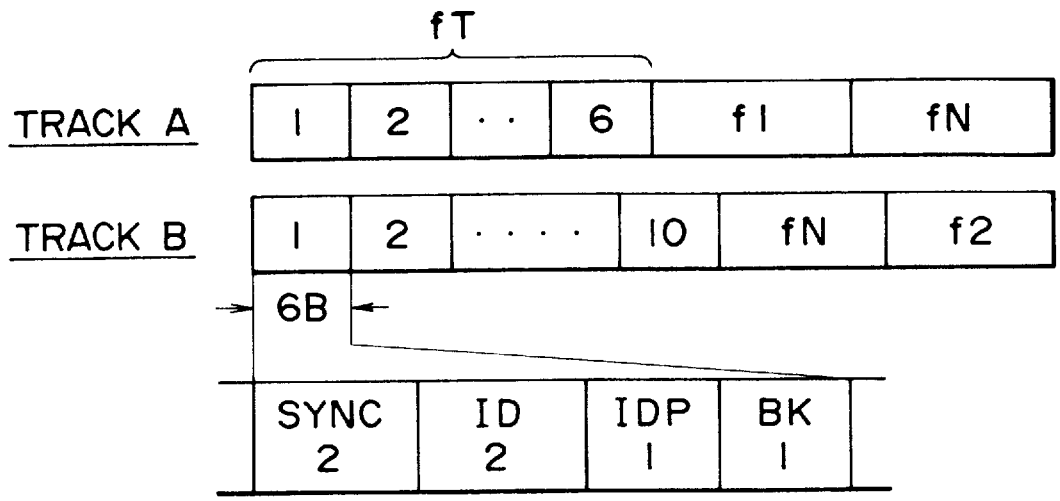
FIG. 5 is a diagram showing the timing sync and ATF pilot signals in a digital VCR according to an embodiment of the invention.
FIG. 6 is a diagram showing an example of ID data recorded in the timing sync in an embodiment of the invention.

FIG. 5 is a diagram showing the timing of the digital VCR and the ATF pilot signal according to an embodiment of the invention. In the track A, six blocks of timing sync fT are recorded from the head and then a first pilot signal of frequency f1 and a Nyquist frequency fN are recorded. In the track B, 10 blocks of timing sync are recorded from the head and then Nyquist frequency fN and a second pilot signal of frequency f2 are recorded. This is the pattern of the SP mode which differs somewhat from that of the LP mode.

As described above, the timing sync is recorded in the ATF area at portions where the first and second pilot signals are not recorded. The tracks shown are those recorded by recording heads having mutually different azimuth angles. Description as to details of the pilot signal and the ATF control will be omitted because it is not directly related to the substance of the present invention.

As shown in FIG. 5, the timing sync having a sync block structure of six-byte length includes two bytes of synchronous code, two bytes of ID signal, one byte of parity IDP for error correction of the ID signal, and one byte of vacant area. When a television signal is recorded in the pattern shown in FIG. 2, the ID signal of two bytes in the timing sync is as shown in FIG. 6 as:

(a) the most significant bit of the first byte: discrimination between SP/LP;

(b) the seventh bit of the first byte: format type;

(c) the sixth and fifth bits of the first byte: record data, that is, identification of its timing sync;

(d) the fourth to second bit of the first byte: format type;

(e) the least significant bit of the first byte: reserved;

(f) the most significant bit to the sixth bit of the second byte: reserved;

(g) the fifth bit to least significant bit of the second byte: sync block number.

Figure 7:
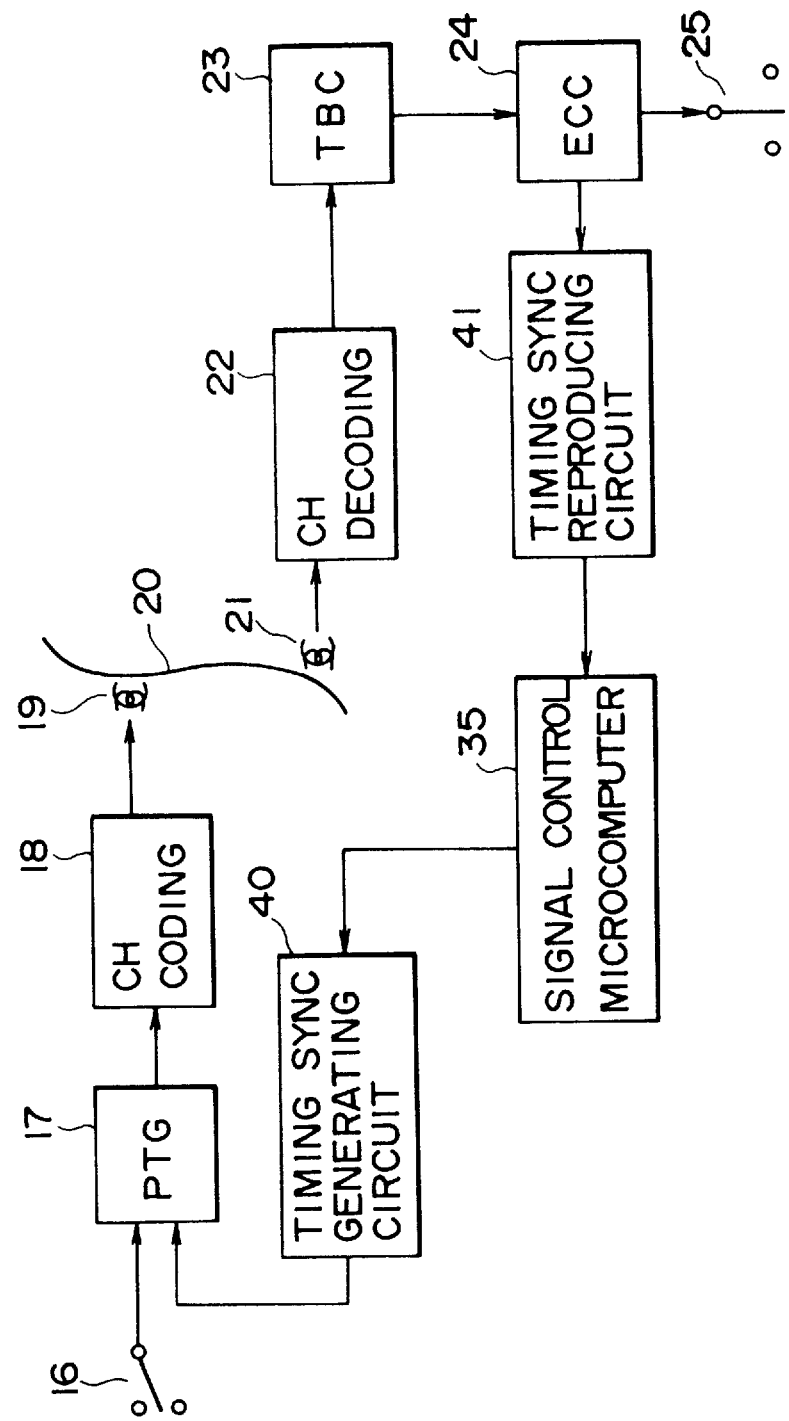
FIG. 7 is a block diagram showing a structure for processing various types of ID data shown in FIG. 6.

FIG. 7 is a block diagram showing a structure for processing various types of the ID data shown in FIG. 6. Parts therein corresponding to those shown in FIG. 1 are denoted by the same reference numerals.

The timing sync generating circuit 40 is controlled by the signal control microcomputer 35 and generates the timing sync as shown in FIG. 5. At this time, as shown in FIG. 6, the format type corresponding to the control data in the four bits of ID of two bytes in the timing sync is set up. The output of the timing sync generating circuit 40 is supplied to the parity generating circuit 17, passed through the channel coding circuit 18, and recorded by the recording head 19 on the magnetic tape 20.

In the reproduction operation, the recorded signal is reproduced by the reproduce head 21 from the magnetic tape 20 and supplied to the timing sync reproducing circuit 41 through the channel coding circuit 22, the time base corrector 23, and the ECC circuit 24. The timing sync reproducing circuit 41 reproduces the timing sync and supplies it to the signal control microcomputer 35. The signal control microcomputer 35 controls the ECC circuit 24 according to the format type set up in the four bits of the ID. Thus, by having the data identifying the format recorded on the tape, the data can be utilized in the reproduction operation.

In addition to the above described operations, the digital VCR according to the present invention can be made to perform the following operations by using an IC card:

(a) Using an IC card storing control data corresponding to the transmission format of the digital signal recorded on the magnetic tape for controlling the signal processing circuits in the reproducing system in response to the control data.

(b) The digital VCR can be utilized as a terminal unit for an IC card application system. For example, the host interface 2c can be connected to a modem and this modem connected through the public network to a host computer in a bank, a stock brokerage company, a department store, or an airline. Then, by using an IC card issued by such company, home banking, home trade, home shopping, home reservation, and so on can be made. Since the remote controller 36 belonging to the digital VCR 1 is provided with various operation keys such as numeric keys, a dedicated key pad for carrying out such a banking, shopping, or reservation procedure becomes unnecessary and the IC card reader/writer needs no additional key pad interface. Further, the television picture receiver or monitor device connected to the digital VCR 1 or an LCD display provided on the remote controller 36 can be utilized as a display unit to be used in the above procedures.

(c) Using an IC card storing control data corresponding to the kind of recorded signal, for example, HDTV or SDTV, and/or the record mode, for example SP or LP, the algorithm for the shuffling circuit 13, compression coding circuit 14, and framing circuit 15, all comprised of DSPs, can easily be set up. In addition, the number of revolutions of the rotating head drum or the traveling speed of the magnetic tape may be set up by the control data stored in the IC card.

(d) By using an IC card to control the deframing circuit 26, compression decoding circuit 27, and deshuffling circuit 28, all composed of DSPs, reproduced signals of digital broadcast data which have been compressed using various algorithms can be decoded.

(e) Using an IC card the selection frequency of the incorporated tuner 31 can be controlled. Thus, even when the number of reception frequencies is increased in the future, the selection frequency can be controlled with an IC card.

(f) By providing a scramble decoder and using an IC card storing control data to achieve descrambling, the scramble decoder can be controlled.

According to the present invention as described above, when it is desired to record transmission formats, such as digital broadcasting, streamer, and the like, to which are not yet utilized but which will appear in the future, such formats can be supported by an existing digital video signal recording and reproducing apparatus by using an IC card storing control data for the signal processing circuits corresponding to each new format.

Further, by means of the incorporated IC card reader/writer, the apparatus can be used as a terminal unit for an IC card application system and hence, the use of the digital video signal recording and reproducing apparatus can be expanded.

Finally, it must be noted that although the present invention is described by reference to particular embodiments thereof, many changes and modifications of the invention may become apparent to those skilled in the art without departing from the spirit and scope of the invention, which is only limited by the appended claims.

What is claimed is:

1. A digital recording and reproducing apparatus for recording on and reproducing from a recording medium a digital video signal having one of a plurality of respectively different data recording formats, comprising:

a digital video signal recording/reproducing unit for recording/reproducing said digital video signal and including a digital signal processor having controllable shuffling/deshuffling circuits for ordering/de-ordering of the digital video signal data, controllable encoding/decoding circuits for encoding/decoding said digital video signal data, and framing/deframing circuits for arranging/de-arranging frames of said digital video data, said recording formats specifying how signal information is shuffled/deshuffled, encoded/decoded, and framed/deframed on said recording medium, and operation of said digital signal processor being adjusted according to said one format of said digital video signal;

an IC card for storing control data for said digital signal processor and including data corresponding to said one format of said digital video signal;

an IC card reading/writing unit integrated into said video signal recording/reproducing unit, said IC card being removably inserted in said IC card reading/writing unit, and said IC card reading/writing unit obtaining said control data for said digital signal processor stored by said IC card when said IC card is inserted; and control means for controlling said video signal recording/reproducing unit and said digital signal processor according to said control data read by said IC card reading/writing unit from said removable IC card, including said data specifying said one format of said digital video signal.

2. The recording and reproducing apparatus according to claim 1, wherein said control data includes a broadcast transmission format of said digital video signal.

3. The recording and reproducing apparatus according to claim 2, wherein said control data includes a record track pattern of said digital video signal.

4. The recording and reproducing apparatus according to claim 2, wherein said control data includes a sync block length of said digital video signal.

5. The recording and reproducing apparatus according to claims 2, 3, or 4, wherein said video signal recording/reproducing unit records data of said broadcast transmission format of said digital video signal in an automatic tracking frequency area of a track on said recording medium.

6. The recording and reproducing apparatus according to claims 2, 3, or 4, wherein said video signal recording/reproducing unit reproduces said digital video signal from said recording medium in accordance with said control data corresponding to said broadcast transmission format of said digital video signal.

7. The recording and reproducing apparatus according to claims 1, 2, 3, or 4, wherein said encoding/decoding circuits include a compression coding circuit for setting up a compression coding format according to said control data.

8. The recording and reproducing apparatus according to claim 5, wherein said encoding/decoding circuits include a compression coding circuit for setting up a compression coding format according to said control data.

9. The recording and reproducing apparatus according to claim 6, wherein said encoding/decoding circuits include a compression coding circuit for setting up a compression coding format according to said control data.

10. The recording and reproducing apparatus according to claims 1, 2, 3, or 4, wherein said video signal recording/reproducing unit further comprises an integrated tuner having a selection frequency controlled according to said control data.

11. The recording and reproducing apparatus according to claim 5, wherein said video signal recording/reproducing unit further comprises an integrated tuner having a selection frequency controlled according to said control data.

12. The recording and reproducing apparatus according to claim 6, wherein said video signal recording/reproducing unit further comprises an integrated tuner having a selection frequency controlled according to said control data.

13. The recording and reproducing apparatus according to claims 1, 2, 3, or 4, wherein said video signal recording/reproducing unit further comprises an integrated descramble decoder controlled according to said control data for descrambling a scrambled digital video signal.

14. The recording and reproducing apparatus according to claim 5, wherein said video signal recording/reproducing unit further comprises an integrated descramble decoder controlled according to said control data for descrambling a scrambled digital video signal.

15. The recording and reproducing apparatus according to claim 6, wherein said video signal recording/reproducing unit further comprises an integrated descramble decoder controlled according to said control data for descrambling a scrambled digital video signal.

16. The recording and reproducing apparatus according to claims 1, 2, 3, or 4, wherein said video signal recording/reproducing unit further comprises interface means for connecting said video signal recording/reproducing unit to an information transmission network, said video signal recording/reproducing unit serving as an IC card terminal unit.

17. The recording and reproducing apparatus according to claim 5, wherein said video signal recording/reproducing unit further comprises interface means for connecting said video signal recording/reproducing unit to an information transmission network, said video signal recording/reproducing unit serving as an IC card terminal unit.

18. The recording and reproducing apparatus according to claim 6, wherein said video signal recording/reproducing unit further comprises interface means for connecting said video signal recording/reproducing unit to an information transmission network, said video signal recording/reproducing unit serving as an IC card terminal unit.

* * * * *